United States Patent
Tsang et al.

(10) Patent No.: US 12,481,916 B2
(45) Date of Patent: Nov. 25, 2025

(54) QUERY-DRIVEN CHALLENGE OF AI BIAS

(71) Applicant: INTERNATIONAL BUSINESS MACHINES CORPORATION, Armonk, NY (US)

(72) Inventors: Nicholas Tsang, Saratoga, CA (US); Dana L Price, Surf City, NC (US); Diane Chalmers, Rochester, MN (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 17/652,754

(22) Filed: Feb. 28, 2022

(65) Prior Publication Data

US 2023/0274179 A1   Aug. 31, 2023

(51) Int. Cl.
*G06N 20/00* (2019.01)
*G06F 40/205* (2020.01)
*G06F 40/40* (2020.01)

(52) U.S. Cl.
CPC ........... *G06N 20/00* (2019.01); *G06F 40/205* (2020.01); *G06F 40/40* (2020.01)

(58) Field of Classification Search
CPC ....... G06N 20/00; G06F 40/205; G06F 40/40; G06F 40/30
See application file for complete search history.

(56) References Cited

U.S. PATENT DOCUMENTS

| | | | |
|---|---|---|---|
| 11,048,741 B2 | 6/2021 | Cintas et al. | |
| 11,080,601 B2 | 8/2021 | Lyske et al. | |
| 11,132,499 B2 | 9/2021 | Liang et al. | |
| 2015/0371191 A1 | 12/2015 | Taylor et al. | |
| 2018/0046764 A1* | 2/2018 | Katwala | G16H 15/00 |
| 2019/0057356 A1 | 2/2019 | Arsen et al. | |
| 2019/0340516 A1* | 11/2019 | Kumar | G06N 5/02 |
| 2020/0077136 A1* | 3/2020 | Kwatra | G06N 5/02 |
| 2020/0357001 A1* | 11/2020 | Lopez Garcia | G06Q 30/018 |
| 2021/0124989 A1 | 4/2021 | Kim et al. | |

(Continued)

FOREIGN PATENT DOCUMENTS

| | | | | |
|---|---|---|---|---|
| CN | 112785001 A | | 5/2021 | |
| CN | 113728341 A | * | 11/2021 | ........... G10L 15/063 |

(Continued)

OTHER PUBLICATIONS

Anonymous, "Content Recommendation for Exploration of Tabular Data," an IP.com Prior Art Database Technical Disclosure, IP.com No. IPCOM000263078D, Jul. 27, 2020, 4 pgs.

(Continued)

*Primary Examiner* — Hassan Mrabi
(74) *Attorney, Agent, or Firm* — Jordan T. Schiller (57) ABSTRACT

A system, program product, and method for processing challenges to potential artificial intelligence (AI) biases. The method includes injecting one or more first values associated with one or more respective variables into an AI platform, and generating, through the AI platform, one or more first outcomes. The method also includes collecting feedback with respect to the one or more outcomes, and parsing the feedback through a natural language understanding (NLU) application. The method further includes determining, subject to the parsing, one or more bias factors embedded within the AI platform.

20 Claims, 7 Drawing Sheets

(56) References Cited

U.S. PATENT DOCUMENTS

| | | | | |
|---|---|---|---|---|
| 2022/0374797 | A1* | 11/2022 | Kalinski | G06N 3/08 |
| 2023/0222531 | A1* | 7/2023 | Cella | G06Q 10/0631 |
| | | | | 705/7.31 |
| 2024/0118702 | A1* | 4/2024 | Cella | G06Q 10/0635 |
| 2025/0166102 | A1* | 5/2025 | O'Malley | G06Q 10/101 |

FOREIGN PATENT DOCUMENTS

| | | | | |
|---|---|---|---|---|
| IN | 201841044679 | A | 5/2020 | |
| WO | WO-2019227062 | A1* | 11/2019 | G06N 5/025 |
| WO | 2021137897 | A1 | 7/2021 | |
| WO | 2021158984 | A1 | 8/2021 | |

OTHER PUBLICATIONS

Anonymous, "Processing and Transforming Collected Data," an IP.com Prior Art Database Technical Disclosure, IP. No. IPCOM000238590D, Sep. 4, 2014, 50 pgs.

Bernard et al., "A dynamic query to delineate emergent science and technology: the case of nano science and technology," http://risis.eu/wp-content/uploads/2015/03/Report-Task1_Nano.pdf, 2015, 24 pgs.

Good et al., "Individual Ambidexterity: Exploring and Exploiting in Dynamic Contexts," http://www.tandfonline.com/loi/vjrl20, published online Jul. 18, 2013, 21 pgs.

Lamkhede et al., "A Method and System for Optimizing Vertical Search Results based on User Feedback," an IP.com Prior Art Database, IP.com No. IPCOM000220230D, Jul. 26, 2012, 4 pgs.

Mell et al., "The NIST Definition of Cloud Computing," Recommendations of the National Institute of Standards and Technology, U.S. Department of Commerce, Special Publication 800-145, Sep. 2011, 7 pgs.

Osta et al., "Don't Talk about Implicit Bias Without Talking about Structural Racism," National Equity Project, Jun. 13, 2019, 10 pgs.

UC Davis, Implicit Bias Series, Center for Educational Effectiveness, cee.ucdavis, edu, https://cee.ucdavis.edu/jitt/implicit-bias , 2020, 7 pgs.

* cited by examiner

QUERY-DRIVEN CHALLENGE OF AI BIAS

BACKGROUND

The present disclosure relates to processing challenges to potential artificial intelligence (AI) biases, and, more specifically, to process users' query-driven challenges to AI model outputs through natural language understanding (NLU).

Many known artificial intelligence (AI) platforms use one or more machine learning (ML) models. Presently, there is an effort in the AI/ML communities to identify and eliminate human biases that may potentially be introduced into the AI/ML algorithms through human interface with the respective platforms and models.

SUMMARY

A system, a computer program product, and method are provided for processing users' challenges to potential AI biases.

In one aspect, a computer system is provided for processing challenges to potential AI biases. The system includes one or more processing devices and at least one memory device operably coupled to the one or more processing device. The system also includes a bias evaluation engine at least partially resident within the one or more memory devices. The bias evaluation engine is configured to inject one or more first values associated with one or more respective variables into an AI platform, and generate, through the AI platform, one or more first outcomes. The bias evaluation engine is also configured to collect feedback with respect to the one or more outcomes, and parse the feedback through a natural language understanding (NLU) application. The bias evaluation engine is further configured to determine, subject to the parsing, one or more bias factors embedded within the AI platform.

In another aspect, a computer program product embodied on at least one computer readable storage medium having computer executable instructions for processing challenges to potential AI biases is provided. The computer executable instructions when executed also cause the one or more computing devices to inject one or more first values associated with one or more respective variables into an AI platform, and generate, through the AI platform, one or more first outcomes. The computer executable instructions when executed also cause the one or more computing devices to collect feedback with respect to the one or more outcomes, and parse the feedback through a natural language understanding (NLU) application. The computer executable instructions when executed further cause the one or more computing devices to determine, subject to the parsing, one or more bias factors embedded within the AI platform.

In yet another aspect, a computer-implemented method is provided for processing challenges to potential AI biases. The method includes injecting one or more first values associated with one or more respective variables into an AI platform, and generating, through the AI platform, one or more first outcomes. The method also includes collecting feedback with respect to the one or more outcomes, and parsing the feedback through a natural language understanding (NLU) application. The method further includes determining, subject to the parsing, one or more bias factors embedded within the AI platform.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to processing users' challenges to potential AI biases. While the present disclosure is not necessarily limited to such applications, various aspects of the disclosure may be appreciated through a discussion of various examples using this context.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments. In addition, it will be appreciated that, although specific embodiments have been described herein for purposes of illustration, various modifications may be made without departing from the spirit and scope of the embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many known artificial intelligence (AI) platforms use one or more machine learning (ML) models. Presently, there is an effort in the AI/ML communities to identify and eliminate human biases that may potentially be introduced into the AI/ML algorithms through human interface with the respective AI platforms.

Figure 1:
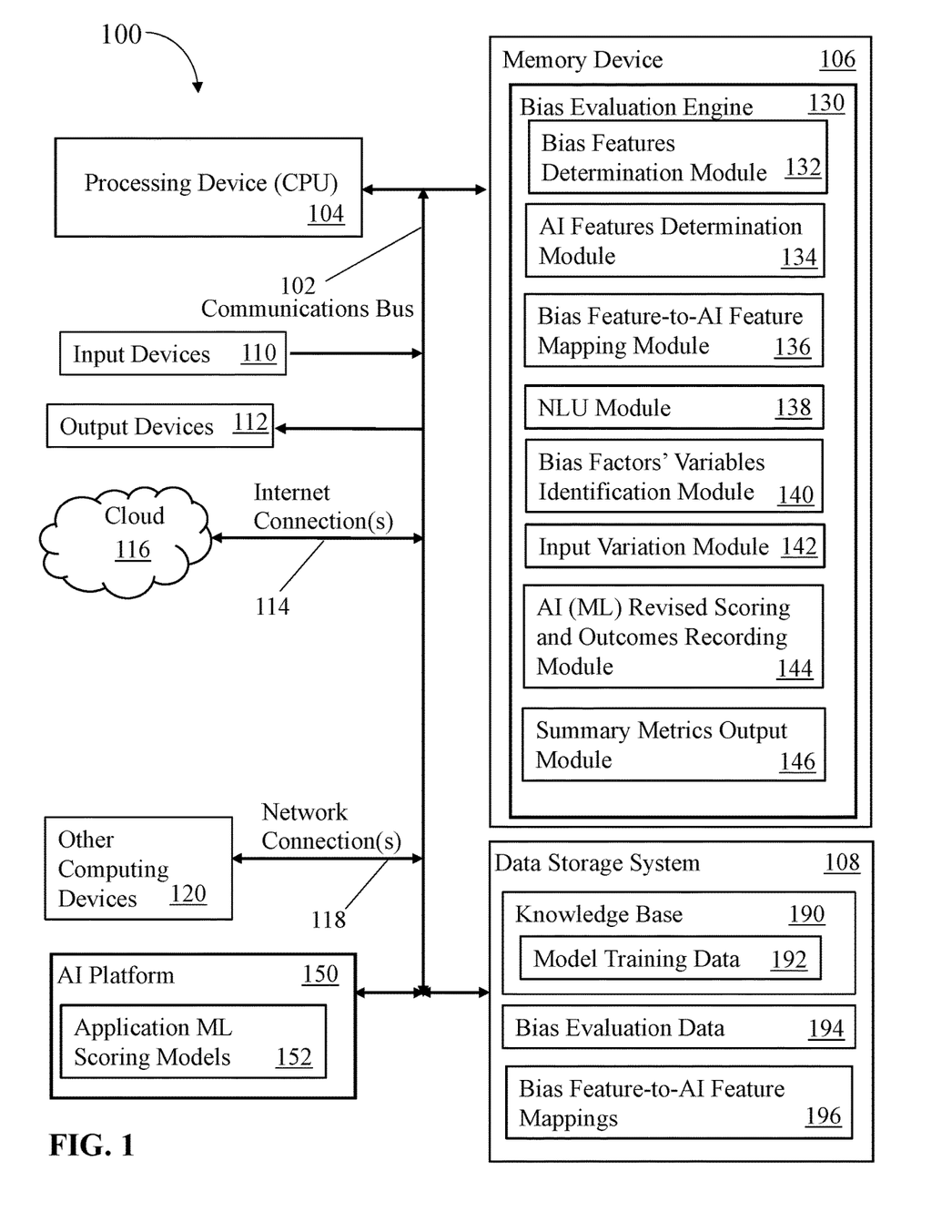
FIG. 1 is a block schematic diagram illustrating a computer system configured to process users' challenges to potential artificial intelligence (AI) biases, in accordance with some embodiments of the present disclosure.

Referring to FIG. 1, a block schematic diagram is presented illustrating a computer system, i.e., a bias challenge system 100 (herein referred to as "the system 100") that is configured to process users' challenges to potential artificial intelligence (AI) biases, in accordance with some embodiments of the present disclosure. The system 100 includes one or more processing devices 104 (only one shown) communicatively and operably coupled to one or more memory devices 106 (only one shown) through a communications bus 102, and in some embodiments, through a memory bus (not shown). In some embodiments, the processing device 104 is a multicore processing device. The system 100 also includes a data storage system 108 that is communicatively coupled to the processing device 104 and memory device 106 through the communications bus 102. In at least some embodiments, the data storage system 108 provides storage to, and without limitation, a knowledge base 190 that includes at least a portion of the data to enable operation of the system 100 as described further herein.

The system 100 further includes one or more input devices 110 and one or more output devices 112 communicatively coupled to the communications bus 102. In addition, the system 100 includes one or more Internet connections 114 (only one shown) communicatively coupled to the cloud 116 through the communications bus 102, and one or more network connections 118 (only one shown) communicatively coupled to one or more other computing devices 120 through the communications bus 102. In some embodiments, the Internet connections 114 facilitate communication between the system 100 and one or more cloud-based centralized systems and/or services (not shown in FIG. 1). In at least some embodiments, the system 100 is a portion of a cloud computing environment (see FIG. 4), e.g., and without limitation, the system 100 is a computer system/server that may be used as a portion of a cloud-based systems and communications environment through the cloud 116 and the Internet connections 114.

In one or more embodiments, a bias evaluation engine 130 (herein referred to as "the engine 130") is resident within the memory device 106. The engine 130 is discussed in detail further in this disclosure. The engine 130 is configured to process users' challenges to potential AI biases, and, more specifically, to process users' query-driven challenges to AI model outputs through natural language understanding (NLU). In at least some embodiments, the engine 130 resident in the memory device 106 is configured to run continuously in the background to automatically execute the processing of users' challenges to potential AI biases. In some embodiments, the engine 130 is engaged for specific tasking by the users thereof.

In at least some embodiments, the engine 130 is configured to determine if bias exists in the respective AI algorithms and to identify such biases. The engine 130 includes a bias features determination module 132 that is configured to determine, i.e., identify one or more sets of bias features that have a potential for a presence in an AI platform 150 (discussed further herein), e.g., and without limitation, age, gender, race, religion, residential location, etc. The engine 130 also includes an AI features determination module 134 that is configured to capture and list the features of the respective algorithms of the AI platform 150, where the AI features facilitate generating the various outputs, e.g., and without limitation, predictions and outcomes, such outcomes including decisions and conclusions, where the term "outcomes" is the term predominately used further herein. The engine 130 further includes a bias feature-to-AI feature mapping module 136 configured to construct a bias feature-to-AI feature mapping 196 (discussed further below) between the bias features and the features of the AI platform 150. In addition, the engine 130 includes a natural language understanding (NLU) module 138 configured to execute the NLU operations including, without limitation, parsing feedback on the outcomes from the AI platform 150 through one or more NLU applications embedded therein. Moreover, the engine 130 includes a bias factors' variables identification module 140 that is configured to use the bias feature-to-AI feature mapping 196 generated through the bias feature-to-AI feature mapping module 136 to identify at least a portion of the one or more respective variables in each of the one or more bias factors variables. Furthermore, the engine 130 includes an input variation module 142 that is configured to alter the original data input, where the altered data will be used by an application ML scoring model 152 (discussed further below) to generate second, i.e., revised outcomes. The engine 130 also includes an AI (ML) revised scoring and outcomes recording module 144 that is configured to produce the details of the revised outcomes. The engine 130 also includes a summary metrics output module 146 that is configured to transmit the details of the revised outcomes.

In at least some embodiments, the system 100 includes an AI platform 150 with one or more embedded application ML scoring models 152 therein, where each model 152 is associated with one or more particular applications, e.g., credit risk analysis and hiring. In some embodiments, the application ML scoring models 152 are stand-alone ML systems (not shown) that are not embedded in an AI platform 150. In such embodiments, the AI platform 150 will call the stand-alone ML system. The AI platform 150 can consider the respective embedded application ML model a "black box" as long as it knows the "names" of the input variables. For example, an external black-box credit risk model may be used as long as which parameter is "Age." If the age parameter is called "Age," cooperation between the AI platform and the model will be achieved. In contrast, if the age parameter is called something less definitive, e.g., "Variable1," cooperation between the AI platform 150 with respect to interaction with the model will likely not materialize.

Further, in some embodiments, the data storage system 108 is configured to maintain a knowledge base 190 that includes the model training data 192 that is used to train the application ML scoring models 152. The data storage system 108 is also configured to store bias evaluation data 194 that includes data generated through operation of the bias evaluation engine 130, including, without limitation, bias features, features of the AI platform 150 and the application ML scoring models 152, and bias factors associated with the bias features. In addition, the data storage system 108 maintains the bias feature-to-AI feature mappings 196 (discussed further herein).

Figure 2A:
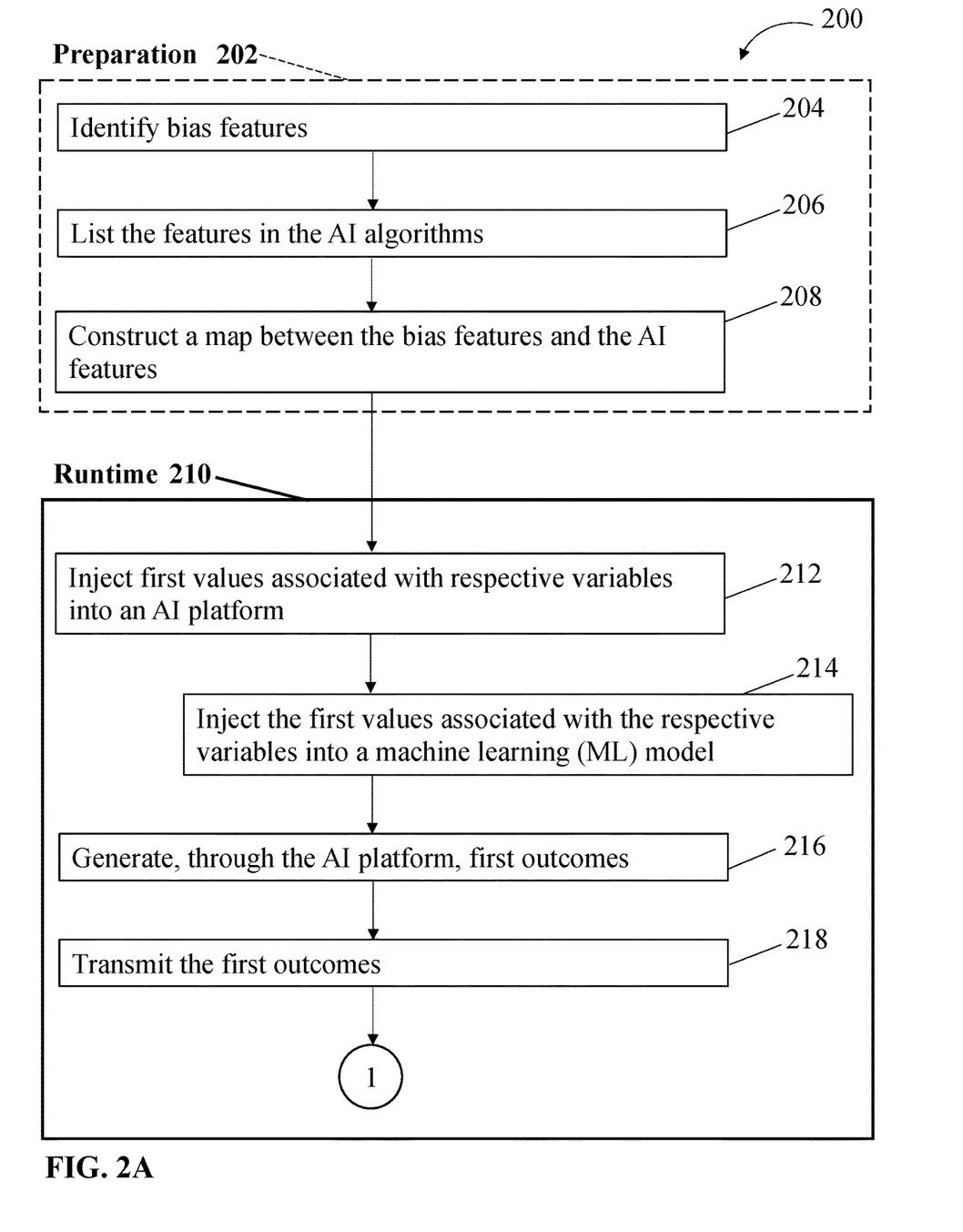
FIG. 2A is a flowchart illustrating a process for processing users' challenges to potential artificial intelligence (AI) biases, in accordance with some embodiments of the present disclosure.

Referring to FIG. 2A, a flowchart is presented illustrating a process 200 for processing users' challenges to potential AI biases. Also referring to FIG. 1, the process 200 includes a preparation portion 202. The preparation portion 202 of the process 200 includes identifying 204 bias features that have a potential for a presence in the AI platform 150 (including any embedded ML models) of interest, e.g., and without limitation, age, gender, race, religion, residential location, etc., through the bias features determination module 132. The identified bias features are stored in the bias evaluation data 194 within the data storage system 108. The preparation portion 202 also includes listing 206 the features in the respective algorithms of the AI platform 150 (including the application ML scoring models 152) through the AI features determination module 134. The identified AI features facilitate generating the various outputs, i.e., outcomes. The AI platform 150 features are stored in the bias evaluation data 194 within the data storage system 108. Given the identified bias features, and the features of the AI platform 150, one or more bias feature-to-AI feature mappings 196 are constructed 208 between the bias features and the features of the AI platform 150 through the bias feature-to-AI feature mapping module 136. In some embodiments, the initial mapping 196 is bootstrapped from a well-known source, e.g., and without limitation, locations where race and zip code are often correlated. In some embodiments, further correlations are discovered with correlation tests run on the training data through one or more of Pearson correlation and Kendall tau correlation. In some embodiments, any mechanism for correlating the features of the identified potential biases to the features of the AI platform 150 may be used. The bias feature-to-AI feature mappings are stored in the bias feature-to-AI feature mapping 196 within the data storage system 108. Accordingly, the preparation portion 202 determines the relationships between the features of the AI platform 150 and the respective features of the potential biases, and these relationships are established to facilitate improving the efficiency of the subsequent runtime operations (discussed further herein).

In one or more embodiments, the process 200 includes a runtime portion 210. The runtime portion 210 includes injecting 212 one or more first values associated with one or more respective variables into the AI platform 150. In one embodiment, the first values are those associated with an applicant for a position at a particular entity, and the first values are provided by the applicant in response to the respective variables, i.e., requests for data such as name, position sought, etc. The engine 130 is substantially agnostic to the domains of the respective subject matter and purpose, and further examples include, without limitation, loan applications (credit risk modeling), college entrance applications, and insurance underwriting risk modeling. In some embodiments, the first values are injected 214 into one or more of the application machine learning (ML) scoring models 152 resident within the AI platform 150. For the present example, the original resume as submitted by the candidate (applicant) includes: "Skills: Python (5 years), Java (15 years); Experience: XYZ Corp. (2003-2021)." These first values are injected 214 into a hiring system in the form of one of the application ML scoring models 152 (where the application is the hiring system) that is resident in the AI platform 150.

In at least some embodiments, the runtime portion 210 also includes generating 216, through the AI platform 150, one or more first outcomes, such as for the present example of a job application, original resume, and applicant, a "no hire" decision is generated 216. Therefore, the hiring system may reject the applicant's resume and provide the following "explainable AI feedback": "Decision: No hire; most positive attribute: some Java skills; and most negative attribute: extensive Python skills." As used herein, the explainable AI feedback includes factors that contributed to the respective outcomes to facilitate understanding of how the outcomes were generated through mechanisms that include, without limitation, predictor importance (which factors/predictors influenced the outcome), statistical significance (identifying the statistical importance of each predictor with respect to the outcome), and contrastive explanation (which features may be changed in order to control the outcomes). In some embodiments, the negative attribute of the "extensive Python skills" in light of the "some Java skills" is based on the position requiring a Java specialist, or a specialist with skills directed toward a niche Java library, and the Python skills may not correlate well with the need for Java skills. The explainable feedback is stored in the bias evaluation data 194. Accordingly, the one or more first outcomes are transmitted 218 to the subject applicant.

Figure 2B:
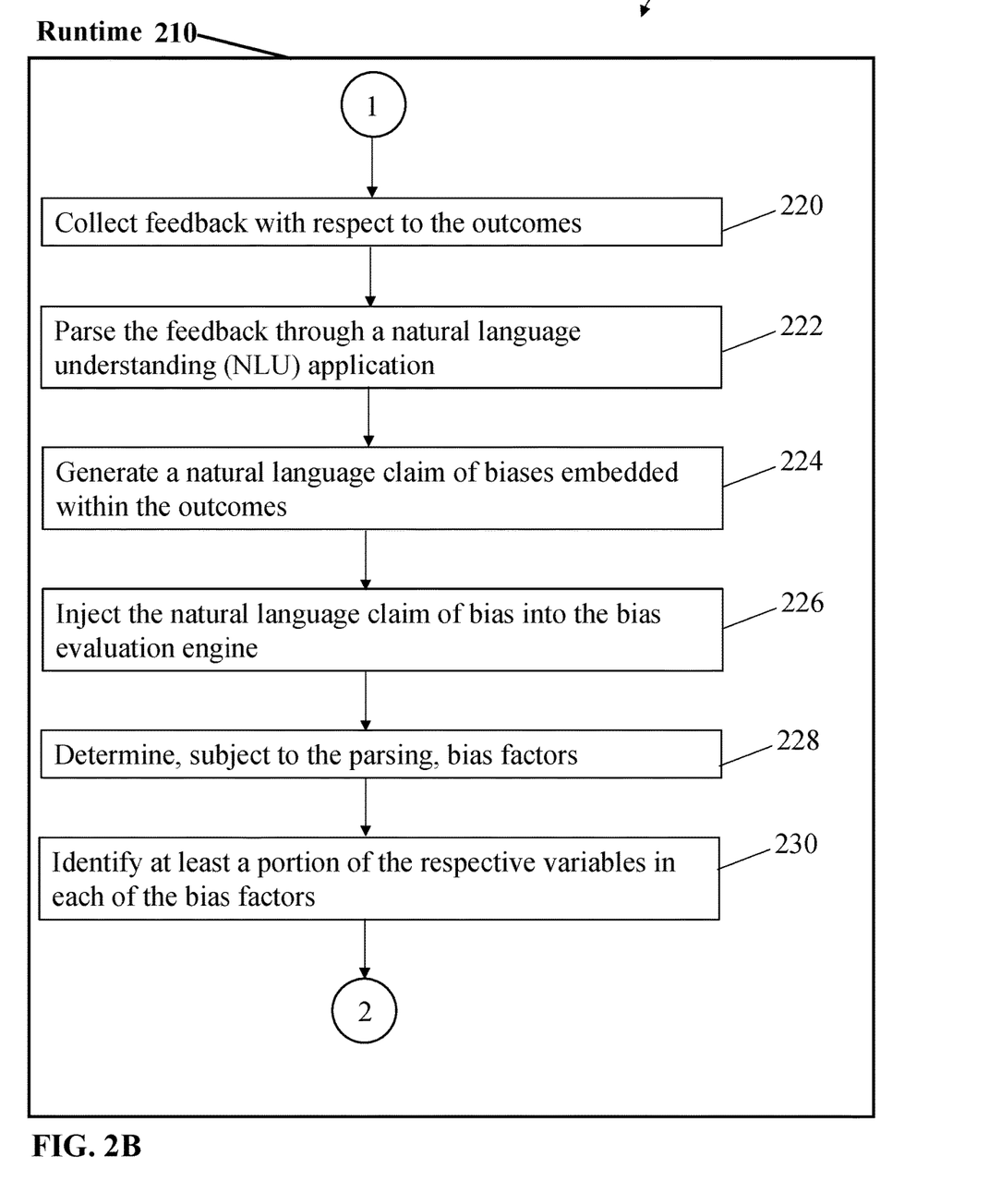
FIG. 2B is continuation of the flowchart shown in FIG. 2A, in accordance with some embodiments of the present disclosure.

Referring to FIG. 2B, a continuation of the flowchart shown in FIG. 2A is presented, in accordance with some embodiments of the present disclosure. Continuing to refer to FIGS. 1 and 2A, in some embodiments, as a result of receipt of the transmitted outcome, a portion of the applicants for a position, including the applicant for the present example, may come to the conclusion that they were not selected for the position due to one or more biases within the hiring process, e.g., and without limitation, an age bias against more mature applicants. Under such circumstances, in one or more embodiments, feedback from the applicant is collected 220 with respect to the provided outcome. The feedback is collected 220 through one or more of a feedback form (for direct feedback) and social media or email (indirect feedback). The feedback, whether direct or indirect, is injected into the engine 130 (through an intermediary for the indirect feedback) as natural language feedback. In at least some embodiments, the collected feedback is parsed 222 through the NLU module 138 through one or more NLU applications embedded therein to detect assertions of bias and associated bias factors. The feedback may include natural language assertions such as, and without limitation, "I feel like my application was rejected because I'm too old," thereby implicating age of candidates as a potential bias factor affecting the outcomes of the AI platform 150. Accordingly, a natural language claim of one or more biases embedded within the one or more outcomes is generated 224, the natural language claim of bias is injected 226 into the engine 130, and further, subject to the parsing 222, one or more bias factors are determined 228. The bias factors are stored in the bias evaluation data 194 in the data storage system 108.

In some embodiments, and more specifically, the natural language claim of bias is injected into the bias factors' variables identification module 140 embedded in the engine 130. The bias factors' variables identification module 140 uses the bias feature-to-AI feature mapping 196 generated through the preparation portion 202 to identify 230 at least a portion of the one or more respective variables in each of the one or more bias factors variables that are either directly and indirectly related to the bias factor(s), e.g., and without limitation, age is directly related to birthdate and indirectly to years of experience.

Figure 2C:
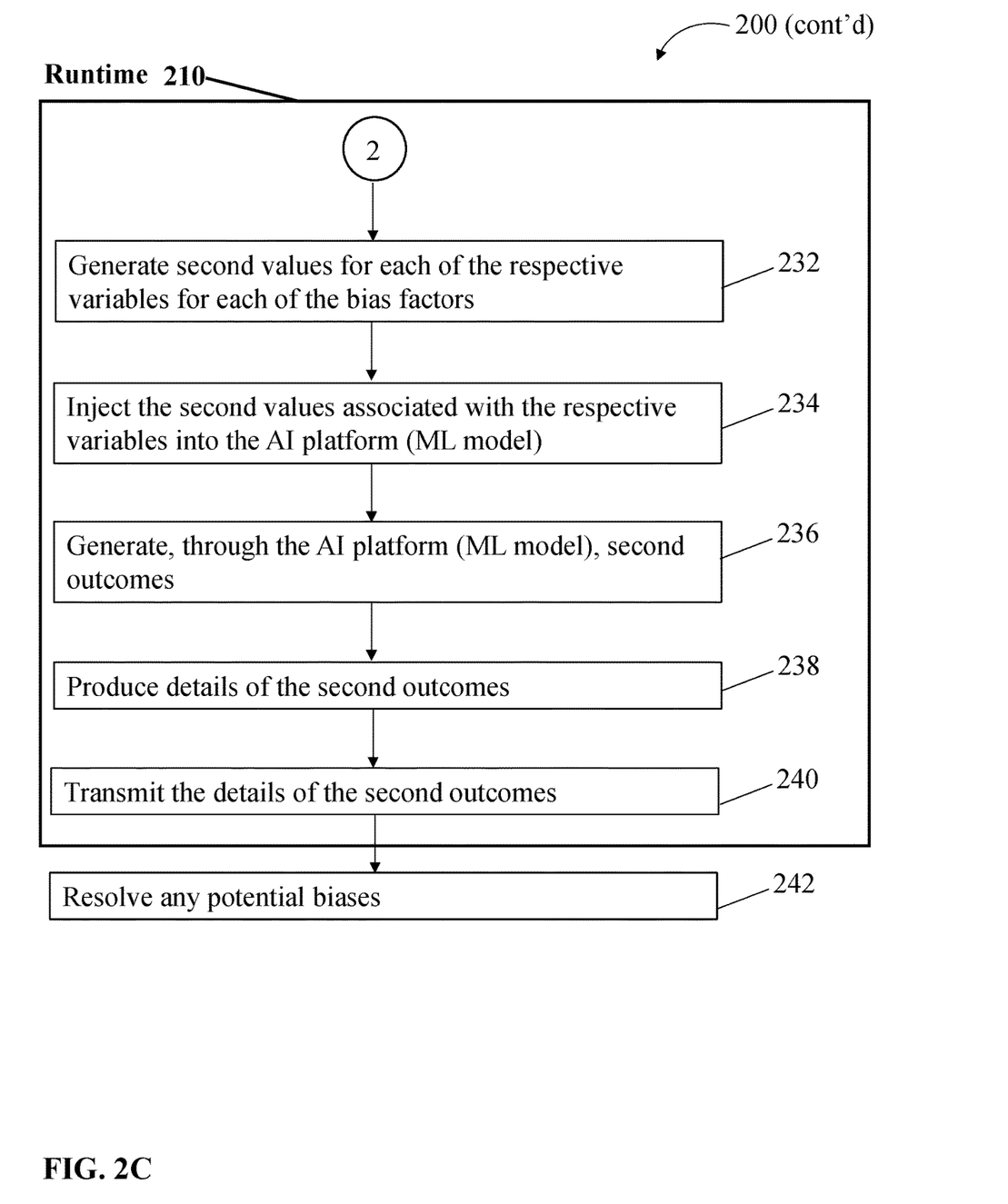
FIG. 2C is continuation of the flowchart shown in FIG. 2B, in accordance with some embodiments of the present disclosure.

Referring to FIG. 2C, a continuation of the flowchart shown in FIG. 2B is presented, in accordance with some embodiments of the present disclosure. Continuing to refer to FIGS. 1 and 2A-2B, in some embodiments, the bias evaluation engine 130 alters the original data input from step 212 through the input variation module 142. More specifically, the input variation module 142 generates 232 one or more second, i.e., altered values for each of the one or more respective variables for each of the one or more bias factors that are a result of method steps 228 and 230, where these altered values will replace the first values. In at least some embodiments, the generation 232 of the altered values includes, for each numeric variable, selecting values representing, for example, and without limitation, minimum values, maximum values, average values, mean values, and quartile values from the data 192 used to train the AI platform 150, and specifically, to train the one or more application ML scoring models 152. In some embodiments, the generation 232 of the numeric altered values includes any mathematical operation and any mechanism for selecting the altered values that enables operation of the engine 130 as described herein. Similarly, for each categorical value, the input variation module 142 from the data 192 is used to train the application ML scoring models 152. For both the numeric and categorical values, the input variation module 142 creates a number N of altered inputs extending over a distribution of the variations of the numeric and categorical values.

In some embodiments, the respective application ML scoring model 152, i.e., the hiring system, has no input mechanism for direct age data injection to mitigate any chance of direct age-related biases in the hiring system. However, for those embodiments that use direct age data, and for the present example of age bias associated with a job applicant, the input variation module 142 will vary the altered age values with example values of 18, 25, 35, 45, and 60 years of age. Therefore, in such embodiments, the original resume is rewritten N times for resubmission with altered age values extracted from the model training data 192, e.g., and without limitation, minimum values, maximum values, average values, mean values, and quartile values. Similarly, the input variation module 142 will also vary the values for years-of-experience through values of, for example, and without limitation, 1 month, 1 year, 5 years, and 10 years. Further, similarly, any date range in the original resume may be altered with greater and smaller time ranges. Accordingly, the altered input values will include values altered from the initial ingested data values used to generate the first outcome.

In some embodiments, including the present example of potential age bias, the key issue is age and the related features are age/birthdate and years of experience. Therefore, the original values for age, years of experience, and employment ranges will be altered. For those embodiments that did not use age or birthdate, and repeated from above, for the present example, the original resume as submitted by the candidate (applicant) includes: "Skills: Python (5 years), Java (15 years); Experience: XYZ Corp. (2003-2021)." Example altered resumes include (where N=3): "Altered Resume 1: Skills: Python (1 year), Java (15 years); Experience: XYZ Corp. (2016-2021);" "Altered Resume 2: Skills: Python (10 years), Java (5 years); Experience: XYZ Corp. (2016-2021);" and, "Altered Resume 3: Skills: Python (10 years), Java (20 years); Experience: XYZ Corp. (1981-2021)."

In one or more embodiments, the input variation module 142 injects 234 the altered values associated with the respective variables into the respective application ML scoring model 152 resident within the AI platform 150. The application ML scoring model 152 generates 236 one or more second, i.e., revised outcomes, where each of the revised outcomes is subject to the previously described altered data inputs. The subsequent generation 236 of the revised outcomes with the altered data also results in producing 238 details of the one or more revised outcomes through the AI (ML) revised scoring and outcomes recording module 144. Such details include one or more of summary metrics, comparisons with the one or more first outcomes, and natural language explanations. In some embodiments, at least a portion of the details are formulated as a summary metric of the N mutated inputs and the associated explainability of the respective outcomes. For example, and without limitation, such summary metric includes values that define of the N alterations, how many had positive results and negative results. Each second outcome includes the associated explainability that includes a description of what features were altered and to what extent, i.e., ranges of the values associated with the alterations. In addition, each revised output is associated with a detailed report that may be downloaded by the affected applicant to clearly describe the altered inputs and the relationships to the revised outcomes. Accordingly, the details of the revised outcomes are stored in the bias evaluation data 194 and are transmitted 240 to the appropriate entities by the summary metrics output module 146.

For those embodiments where a previously undiagnosed bias is discovered, one or more of the AI platform 150, the application ML scoring model 152, and any internal processes are revised through mechanisms separate from the automated runtime steps 212 through 240 to appropriately resolve 242 any potential biases to mitigate any inadvertent effects therefrom.

The system, computer program product, and method as disclosed herein facilitate overcoming the disadvantages and limitations of known automated AI and ML applications with potential hidden biases. Such disadvantages are overcome through processing query-driven challenges to AI/ML model outputs through natural language understanding (NLU), thereby leveraging dynamic bias exploration (examination) of AI/ML systems based on in-context need. The embodiments disclosed herein include additional elements that integrate the processes described herein into a practical application that improves, for example, processing loan applications (credit risk modeling), college entrance applications, and insurance underwriting risk modeling through registering any potential biases in natural language and initiating investigation into the potential biases substantially immediately. In addition, the embodiments described herein are configured for enhancing known AI/ML modeling systems through providing applicants with in-context explainability to improve trust in the respective systems. Once any potential bias issues are identified, they may be resolved. Accordingly, significant improvements to known automated AI and ML applications and systems are realized through the present disclosure.

Figure 3:
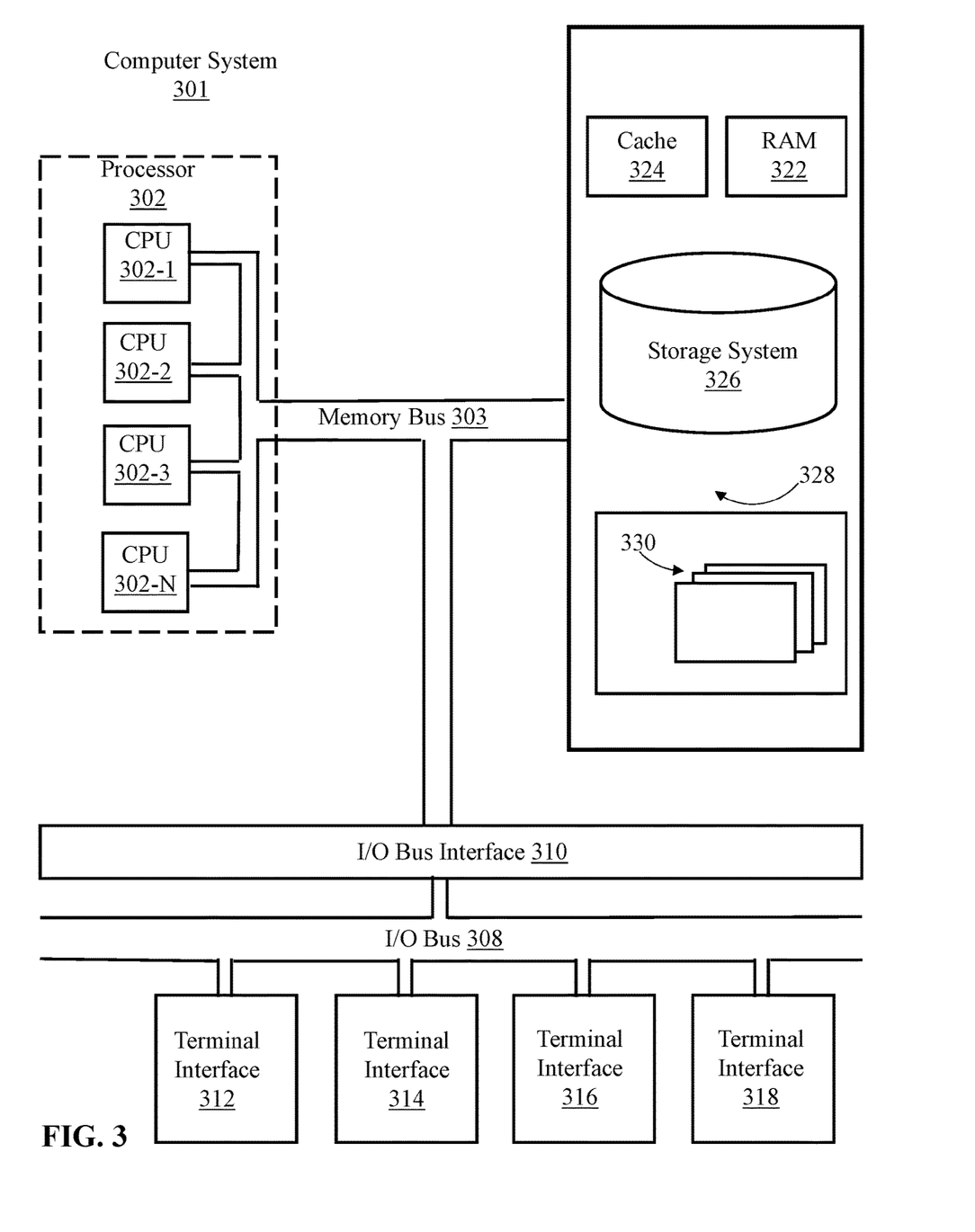
FIG. 3 is a block schematic diagram illustrating a computing system, in accordance with some embodiments of the present disclosure.

Referring now to FIG. 3, a block schematic diagram is provided illustrating a computing system 301 that may be used in implementing one or more of the methods, tools, and modules, and any related functions, described herein (e.g., using one or more processor circuits or computer processors of the computer), in accordance with some embodiments of the present disclosure. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302-1, 302-2, 302-3, 302-N, herein collectively referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

A cloud computing environment is service oriented with a focus on statelessness, low coupling, modularity, and semantic interoperability. At the heart of cloud computing is an infrastructure that includes a network of interconnected nodes. The system 501 may be employed in a cloud computing environment.

Figure 4:
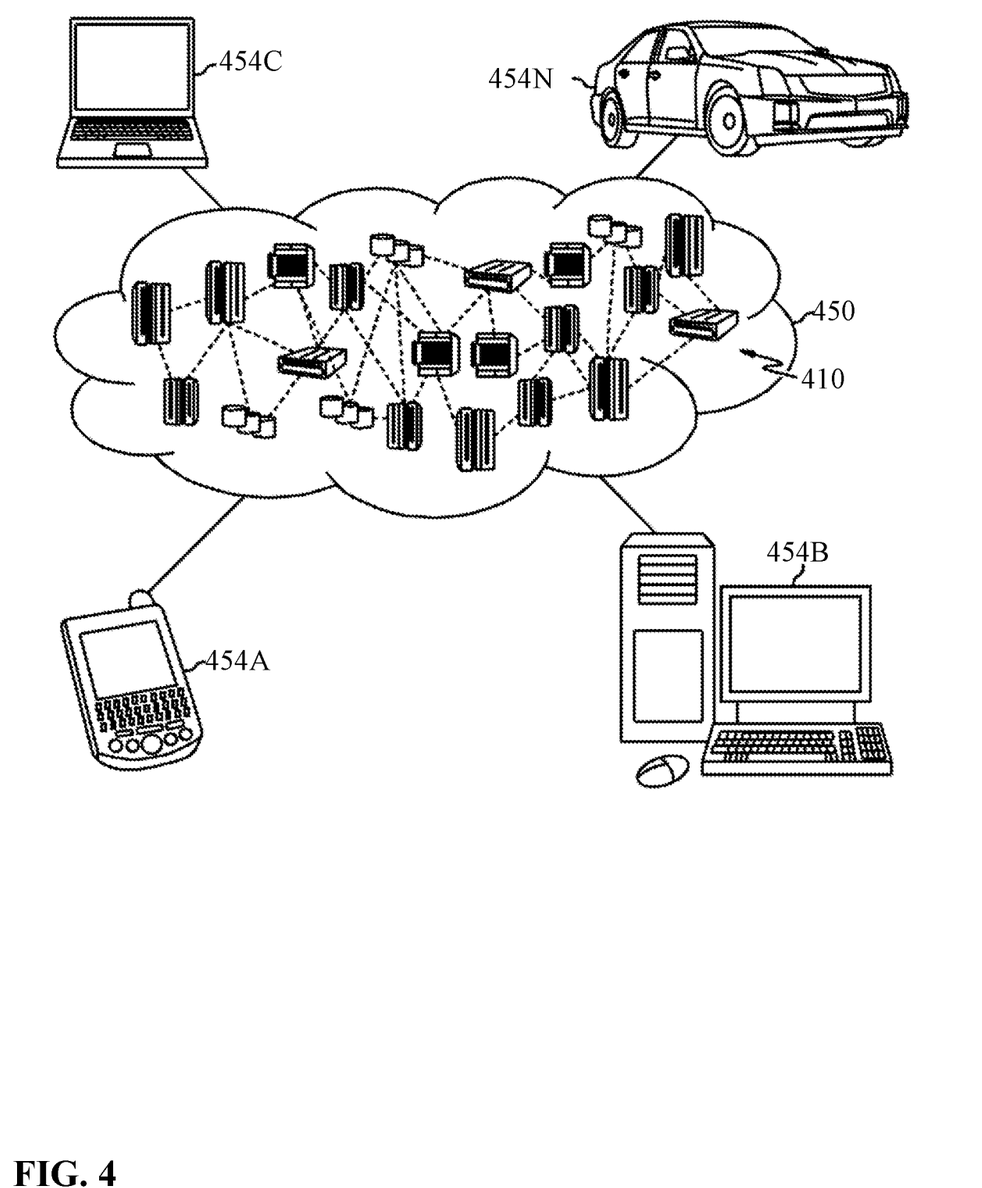
FIG. 4 is a block schematic diagram illustrating a cloud computing environment, in accordance with some embodiments of the present disclosure.

Referring to FIG. 4, a schematic diagram is provided illustrating a cloud computing environment 450, in accordance with some embodiments of the present disclosure. As shown, cloud computing environment 450 comprises one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 410 and cloud computing environment 450 may communicate with any type of computerized device over any type of network and/or network addressable connection (e.g., using a web browser).

Figure 5:
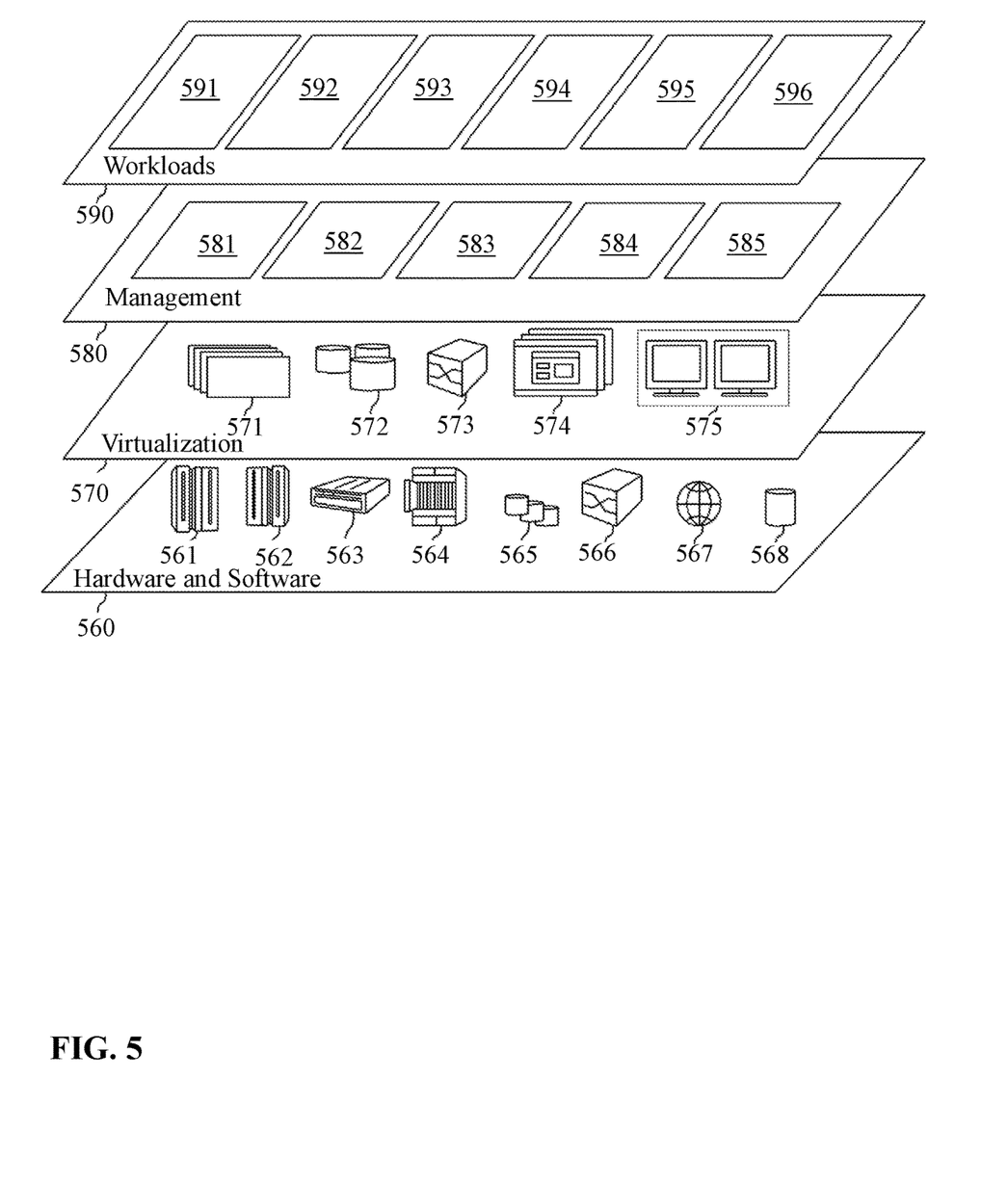
FIG. 5 is a block schematic diagram illustrating a set of functional abstraction model layers provided by the cloud computing environment, in accordance with some embodiments of the present disclosure.

Referring to FIG. 5, a schematic diagram is provided illustrating a set of functional abstraction model layers provided by the cloud computing environment 450 (FIG. 4), in accordance with some embodiments of the present disclosure. It should be understood in advance that the components, layers, and functions shown in FIG. 5 are intended to be illustrative only and embodiments of the disclosure are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; layout detection 593; data analytics processing 594; transaction processing 595; and to processing users' challenges to potential AI biases 596.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for processing challenges to potential artificial intelligence (AI) biases comprising:
   one or more processing devices;
   one or more memory devices communicatively and operably coupled to the one or more processing devices;
   a bias evaluation engine, at least partially resident within the one or more memory devices, configured to:
      inject one or more first values associated with one or more respective variables into an AI platform during runtime;
      capture and list one or more features of a respective algorithm of the AI platform;
      generate, through the one or more features of the respective algorithm of the AI platform, one or more first outcomes, further comprising:
         altering the one or more first values which are used by an application machine learning (ML) scoring model to generate one or more revised outcomes;
         producing details of the one or more revised outcomes; and
         transmitting the details of the one or more revised outcomes via a summary metrics output module;
      construct a bias feature-to-AI feature mapping between one or more bias features and the one or more features of the respective algorithm of the AI platform;
      use the bias feature-to-AI feature mapping generated through a preparation portion to identify at least a portion of the one or more respective variables in each of one or more bias factor variables that are either directly or indirectly related to the one or more bias factors;
      collect feedback with respect to the one or more first outcomes;
      parse the feedback through a natural language understanding (NLU) application;
      determine, subject to the parsing, one or more bias factors embedded within the AI platform; and
      resolve any potential biases to mitigate any inadvertent effects.

2. The computer system of claim 1, wherein the bias evaluation engine is further configured to:
   inject the one or more first values associated with the one or more respective variables into a machine learning (ML) model.

3. The computer system of claim 1, wherein the bias evaluation engine is further configured to:
   transmit the one or more first outcomes; and
   generate a natural language claim of one or more biases embedded within the one or more outcomes.

4. The computer system of claim 1, wherein the bias evaluation engine is further configured to:
   identify at least a portion of the one or more respective variables in each of the one or more bias factors.

5. The computer system of claim 4, wherein the bias evaluation engine is further configured to:
   generate one or more second values for each of the one or more respective variables for each of the one or more bias factors; and
   inject the one or more second values associated with the one or more respective variables into the AI platform.

6. The computer system of claim 5, wherein the bias evaluation engine is further configured to:
   generate, through the AI platform, one or more second outcomes.

7. The computer system of claim 6, wherein the bias evaluation engine is further configured to:
   produce details of the one or more second outcomes, including one or more of:
      summary metrics;
      comparisons with the one or more first outcomes; and
      natural language explanations; and
   transmit the details of the one or more second outcomes.

8. A computer program product embodied on at least one computer readable storage medium having computer executable instructions for processing challenges to potential artificial intelligence (AI) biases, that when executed cause one or more computing devices to:
   inject one or more first values associated with one or more respective variables into an AI platform during runtime;
   capture and list one or more features of a respective algorithm of the AI platform;
   generate, through the one or more features of the respective algorithm of the AI platform, one or more first outcomes, further comprising:
      altering the one or more first values which are used by an application machine learning (ML) scoring model to generate one or more revised outcomes;
      producing details of the one or more revised outcomes; and
      transmitting the details of the one or more revised outcomes via a summary metrics output module;
   construct a bias feature-to-AI feature mapping between one or more bias features and the one or more features of the respective algorithm of the AI platform;
   use the bias feature-to-AI feature mapping generated through a preparation portion to identify at least a portion of the one or more respective variables in each of one or more bias factor variables that are either directly or indirectly related to the one or more bias factors;
   collect feedback with respect to the one or more first outcomes;
   parse the feedback through a natural language understanding (NLU) application;
   determine, subject to the parsing, one or more bias factors embedded within the AI platform; and
   resolve any potential biases to mitigate any inadvertent effects.

9. The computer program product of claim 8, further having computer executable instructions to:
inject the one or more first values associated with the one or more respective variables into a machine learning (ML) model.

10. The computer program product of claim 8, further having computer executable instructions to:
transmit the one or more first outcomes; and
generate a natural language claim of one or more biases embedded within the one or more outcomes.

11. The computer program product of claim 8, further having computer executable instructions to:
identify at least a portion of the one or more respective variables in each of the one or more bias factors.

12. The computer program product of claim 11 further having computer executable instructions to:
generate one or more second values for each of the one or more respective variables for each of the one or more bias factors; and
inject the one or more second values associated with the one or more respective variables into the AI platform.

13. The computer program product of claim 12 further having computer executable instructions to:
generate, through the AI platform, one or more second outcomes.

14. A computer-implemented method for processing challenges to potential artificial intelligence (AI) biases comprising:
injecting one or more first values associated with one or more respective variables into an AI platform during runtime;
capturing and listing one or more features of a respective algorithm of the AI platform;
generating, through the one or more features of the respective algorithm of the AI platform, one or more first outcomes, further comprising:
altering the one or more first values which are used by an application machine learning (ML) scoring model to generate one or more revised outcomes;
producing details of the one or more revised outcomes; and
transmitting the details of the one or more revised outcomes via a summary metrics output module;
constructing a bias feature-to-AI feature mapping between one or more bias features and the one or more features of the respective algorithm of the AI platform;
using the bias feature-to-AI feature mapping generated through a preparation portion to identify at least a portion of the one or more respective variables in each of one or more bias factor variables that are either directly or indirectly related to the one or more bias factors;
collecting feedback with respect to the one or more first outcomes;
parsing the feedback through a natural language understanding (NLU) application;
determining, subject to the parsing, one or more bias factors embedded within the AI platform; and
resolving any potential biases to mitigate any inadvertent effects.

15. The computer-implemented method of claim 14, wherein the injecting one or more first values associated with the one or more respective variables into the AI platform comprises:
injecting the one or more first values associated with the one or more respective variables into a machine learning (ML) model.

16. The computer-implemented method of claim 14, wherein the collecting feedback with respect to the one or more first outcomes comprises:
transmitting the one or more first outcomes; and
generating a natural language claim of one or more biases embedded within the one or more outcomes.

17. The computer-implemented method of claim 14, wherein the determining one or more bias factors comprises:
identifying at least a portion of the one or more respective variables in each of the one or more bias factors.

18. The computer-implemented method of claim 17, further comprising:
generating one or more second values for each of the one or more respective variables for each of the one or more bias factors; and
injecting the one or more second values associated with the one or more respective variables into the AI platform.

19. The computer-implemented method of claim 18, further comprising:
generating, through the AI platform, one or more second outcomes.

20. The computer-implemented method of claim 19, further comprising:
producing details of the one or more second outcomes, including one or more of:
summary metrics;
comparisons with the one or more first outcomes; and
natural language explanations; and
transmitting the details of the one or more second outcomes.

* * * * *